United States Patent [11] 3,607,792

[72] Inventors George Phillip Speranza;
 Harold George Waddill, both of Austin, Tex.
[21] Appl. No. 788,635
[22] Filed Jan. 2, 1969
[45] Patented Sept. 21, 1971
[73] Assignee Jefferson Chemical Company, Inc.
 Houston, Tex.

[54] POLYOXYALKYLENE POLYAMINE VULCANIZING AGENTS FOR EPICHLOROHYDRIN POLYMERS
 16 Claims, No Drawings

[52] U.S. Cl. .................................................. 260/2 A
[51] Int. Cl. ...................................................... C08g 43/00
[50] Field of Search ........................................... 260/2 EP, 2 A

[56] References Cited
UNITED STATES PATENTS

| | | | |
|---|---|---|---|
| 3,158,580 | 11/1964 | Vandenberg ................. | 260/2 |
| 3,236,895 | 2/1966 | Lee et al. ...................... | 260/584 |
| 3,414,529 | 12/1968 | Green et al. .................. | 260/2 |
| 3,453,357 | 7/1969 | Logan .......................... | 264/236 |
| 3,350,352 | 10/1967 | Smith et al. ................... | 260/47 |
| 3,399,174 | 8/1968 | Bvemmer ..................... | 260/47 |

Primary Examiner—William H. Short
Assistant Examiner—E. Nielsen
Attorneys—Carl G. Ries, John R. Kirk, Jr. and H. G. Jackson ABSTRACT: Polyoxypropylene polyamines are vulcanizing agents for halogen-containing polymers such as polyepichlorohydrin. The cured polymers are useful specialty rubbers which are resistant to ozone attack.

3,607,792

POLYOXYALKYLENE POLYAMINE VULCANIZING AGENTS FOR EPICHLOROHYDRIN POLYMERS

BACKGROUND OF THE INVENTION

1. Field of the Invention

The invention pertains to vulcanizing agents for halogen-containing polymers and the resulting vulcanizates.

2. Description of the Prior Art

Anderson E. Robinson's U.S. Pat. 3,026,270 teaches the use of hydrazine, aromatic amines and alkylenediamines as crosslinking agents for polymeric epoxides.

SUMMARY OF THE INVENTION

The invention is a process for vulcanizing halogen-containing polymers such as polyepichlorohydrin by the use of a polyoxyalkylene polyamine vulcanizing agent of the formula $R[(OA)_x NH_2]_y$, where R is a hydrocarbon radical, A is an alkylene radical of from two to four carbon atoms, $x$ has an average value from 1 to 50, and $y$ is an integer from 2 to 4. The group A of the formula represents lower alkylene radicals such as ethylene, propylene 1,2-butylene, 2,3-butylene, trimethylene and tetramethylene. Such amines are available as the products of direct amination of a polyoxyalkylene glycol or they may be obtained by other means such as the reduction of a poly-(cyanoalkyl) ether. The polyoxyalkylene polyamines useful in the process of my invention are mentioned in U.S. Pat. 3,236,895 and copending U.S. Pat. Application 602,167 filed Dec. 16, 1966, now abandoned. The polyoxyalkylene polyamines are obtained by amination of the corresponding polyoxyalkylene polyol of the formula $$R \left[ (OCH_2CH)_n - OCH - CH - OH \atop X \quad Y \quad Z \right]_m$$

wherein R is the nucleus of an oxyalkylation-susceptible aliphatic polyhydric alcohol containing 2–12 carbon atoms and 2–8 hydroxyl groups, Z is an alkyl group containing 1–18 carbon atoms, X and Y are hydrogen or Z, $n$ has an average value of 0–50 and $m$ is an integer of 2–8 corresponding to the number of hydroxyl groups originally present in the polyhydric alcohol. It can be seen that in the above formula if R is a 1,2 1,2-propylene radical, Y is hydrogen, X and Z are methyl, $n$ is one or more and $m$ is two, the products are those of U.S. Pat. NO. 3,236,895. However, if $n$ is zero, the product is the diamine prepared from tripropylene glycol and is thus a lower molecular weight diamine than those that can be obtained by the processes of U.S. Pat. No. 3,236,895.

DESCRIPTION OF THE PREFERRED EMBODIMENTS

Chlorine-containing polymers, in particular, polyepichlorohydrin and copolymers and terpolymers thereof, are vulcanized by reaction with polyoxyalkylene polyamines, particularly polyoxypropylene polyamines of varying molecular weight. The liquid polyoxypropylene polyamine curing agents of my invention act as plasticizers to the polymers and the cured products of my invention are soft and tough rubberlike materials. This internal plasticization effect of the polyoxypropylene polyamines on polymers is shown in the data below. These cured polymer products are particularly useful for specialty applications where low oxygen permeability, solvent resistance and low temperature flexibility is required. Such applications are in gaskets, hoses, sealants, etc. The polyoxypropylene polyamines are particularly useful in the process of my invention because of their compatibility with the polyether polymers. In addition, the polyoxyalkylene polyamines have very low toxicity compared to the known amine curing agents.

The data in the tables below, illustrate the curing characteristics of the polyoxyalkylene polyamines in an epichlorohydrin-ethylene oxide copolymer trademarked Hydrin 200 by B. F. Goodrich Company. The numbers following the polyoxypropylene polyamines represent the molecular weight of the compounds. The polyoxyalkylene polyamine is admixed with the polymer before heating the mixture to a vulcanizing temperature. For example, the polyoxyalkylene polyamine and polymer may be blended by milling on a conventional rubber mill. Any amount of polyoxyalkylene polyamine may be used in the process of my invention, however from 0.5 to 50 parts per hundred (phr.) is the preferred concentration range. Vulcanizing temperatures for my invention range from room temperature to about 350° C., however, 125°–200° C., is a preferred vulcanizing temperature range.

Other additives, generally used in the vulcanization of rubber, for example, fillers, antidegrandants, accelerators, etc., can be present in the process of my invention.

The data in table 1 illustrate four polyoxypropylene polyamine vulcanizing agents of my invention compared to the standard curing agent 2-mercaptoimidazoline vulcanized at 175° C. for 30 minutes. The polymer compositions for vulcanization contain the following:

| | Parts |
|---|---|
| Hydrin 200 | 100 |
| Zinc stearate (lubricant) | 1 |
| Red lead (accelerator) | 5 |
| Nickel dibutyldithiocarbamate (antidegradant) | 1 |
| Carbon black | 30 |
| Vulcanizing agent | As indicated |

The tensile strength, modulus and ultimate elongation reported in the tables were measured according to the American Society for Testing Materials (ASTM) method D638-64t. The Shore A Hardness was measured according to ASTM method D1706-61.

TABLE 1

| | Standard | Polyoxypropylene polyamines | | | |
|---|---|---|---|---|---|
| | | 2,000 | 400 | 190 | 403 |
| Curing agent (phr.) | 1.5 | 15.0 | 3.0 | 1.42 | 2.0 |
| Tensile strength, p.s.i. | 1,920 | 1,350 | 1,560 | 1,550 | 1,700 |
| Modulus at 100% elongation, p.s.i. | 540 | 320 | 420 | 470 | 540 |
| Modulus at 300% elongation, p.s.i. | | 990 | 1,560 | | |
| Ultimate elongation, percent | 295 | 410 | 300 | 260 | 260 |
| Hardness, Shore A, 10 seconds | 64 | 58 | 59 | 63 | 64 |

The polyoxypropylene polyamine 400 of Table 1 is a compound of the structure $$NH_2CH-CH_2-O(CH_2-CH-O)_x-CH_2CH-NH_2 \atop CH_3 \qquad\qquad CH_3 \qquad\qquad CH_3$$

where $x=4.6$.

The polyoxypropylene polyamines of this invention have a low vapor pressure and inhalation of vapors therefrom at room temperature does not present a health hazard. The compounds are only slightly toxic on ingestion by animals and moderately toxic to the skin.

Male albino rats were fed three of the polyoxypropylene polyamines useful in this invention and the toxicity data recorded showed these materials to be only slightly toxic by ingestion. The polyoxypropylene polyamines were incorporated into the diet of the rats for 31 days. The behavior of the animals was unchanged and there were no deaths in a 31-day test period. No relevant gross pathology was noted after the animals were killed at the end of the study.

Four of the polyoxypropylene polyamines useful in this invention were placed on the skin of albino rabbits and the toxicity data recorded showed only moderate toxicity to the skin. However, diamines such as the alkylene diamines are highly toxic to the skin.

Having thus described our invention, we claim:

1. A method for vulcanizing homopolymers of epichlorohydrin and copolymers of epichlorohydrin and ethylene oxide which comprises:

admixing the polymer with a curing agent of the formula
$$R[(OA)_xNH_2]_y$$
where R is an aliphatic hydrocarbon radical, A is an alkylene radical of from two to four carbon atoms, $x$ has an average value from 1 to 50, and $y$ is an integer from 2 to 4 and heating mixture to a curing temperature.

2. A method for vulcanizing a chlorine-containing polymer according to claim 1 wherein A of the formula is propylene.

3. A method for vulcanizing a polymer according to claim 2 wherein the curing agent is a polyoxypropylene polyamine having a molecular weight from about 150 to about 3,000.

4. A method for vulcanizing a polymer according to claim 3 wherein $x$ in the polyoxypropylene polyamine formula has an average value of 6 and $y$ is 2.

5. A method for vulcanizing a polymer according to claim 3 wherein $x$ in the polyoxypropylene polyamine formula has an average value of 3 and $y$ is 2.

6. A method for vulcanizing a polymer according to claim 3 wherein $x$ in the polyoxypropylene polyamine formula has an average value of 15 and $y$ is 2.

7. A method for vulcanizing a polymer according to claim 3 wherein $x$ in the polyoxypropylene polyamine formula has an average value of 30 and $y$ is 2.

8. A method for vulcanizing a polymer according to claim 3 wherein $x$ in the polyoxypropylene polyamine formula has an average value of 15 and $y$ is 3.

9. A homopolymer of epichlorohydrin or copolymer of epichlorohydrin and ethylene oxide vulcanized with a curing agent of the formula
$$R[(OA)_xNH_2]y$$
where R is an aliphatic radical, A is an alkylene radical of from two to four carbon atoms, $x$ has an average value from 1 to 50, and $y$ is an integer from 2 to 4.

10. A polymer according to claim 9 wherein A of the formula is propylene.

11. A polymer according to claim 10 wherein the curing agent is a polyoxypropylene polyamine having a molecular weight from about 150 to about 3,000.

12. A polymer according to claim 11 wherein $x$ in the polyoxypropylene polyamine formula has an average value of 6 and $y$ is 2.

13. A polymer according to claim 11 wherein $x$ in the polyoxypropylene polyamine formula is 3 and $y$ is 2.

14. A polymer according to claim 11 wherein $x$ in the polyoxypropylene average value of the polyoxypropylene polyamine formula has an 21 value of 15 and $y$ is 2.

15. A polymer according to claim 11 wherein $x$ in the polyoxypropylene polyamine formula has an average value of 30 and $y$ is 2.

16. A polymer according to claim 11 wherein $x$ in the polyoxypropylene polyamine formula has an average value of 15 and $y$ is 3.

UNITED STATES PATENT OFFICE

CERTIFICATE OF CORRECTION

Patent No. 3,607,792  Dated September 21, 1971

George Phillip Speranza and Harold George Waddill
Assignors to Jefferson Chemical Company, Inc.
Houston, Texas, a corporation of Delaware It is certified that errors appear in the above-identified patent and that Letters Patent are hereby corrected as shown below:

On the first page, under References Cited, "Bvemmer" should read -- Bremmer --. Column 1, line 44, after "a" and before "1,2-propylene" "1,2" should be omitted; column 1, line 49, the following sentence has been omitted: -- The invention includes the vulcanizates obtained by using the vulcanizing agents, supra, to cure the halogen-containing polymers -- Column 2, line 13, "antidegrandants" should read -- antidegradants --. Column 4, line 5, "aliphatic radical" should read -- aliphatic hydrocarbon radical --; column 4, lines 19 and 20 should read: "polyoxypropylene polyamine formula has an average value of 15 and y is 2."

Signed and sealed this 2nd day of May 1972.

(SEAL)
Attest:

EDWARD M. FLETCHER, JR.  ROBERT GOTTSCHALK
Attesting Officer  Commissioner of Patents